(12) United States Patent
Satterlee et al.

(10) Patent No.: US 7,852,789 B2
(45) Date of Patent: Dec. 14, 2010

(54) METHODS, SYSTEMS, AND/OR DEVICES FOR PROVIDING NETWORK ACCESS

(75) Inventors: Michael Satterlee, Clifton Park, NY (US); John Gibbons, Ballston Lake, NY (US); Neal Shackleton, Tierra Verde, FL (US); Jamil Cheikhali, Tampa, FL (US)

(73) Assignee: AT&T Intellectual Property II, L.P., Reno, NV (US)

( * ) Notice: Subject to any disclaimer, the term of this patent is extended or adjusted under 35 U.S.C. 154(b) by 530 days.

(21) Appl. No.: 11/904,260

(22) Filed: Sep. 26, 2007

(65) Prior Publication Data
US 2008/0317039 A1 Dec. 25, 2008

Related U.S. Application Data (60) Provisional application No. 60/945,316, filed on Jun. 20, 2007.

(51) Int. Cl.
*H04L 12/28* (2006.01)
*H04L 12/56* (2006.01)
*H04J 3/16* (2006.01)

(52) U.S. Cl. .................. 370/255; 370/395.53; 370/466

(58) Field of Classification Search .................. 370/254, 370/255, 389, 395.5, 395.51, 395.52, 395.53, 370/400, 401, 466
See application file for complete search history.

(56) References Cited

U.S. PATENT DOCUMENTS

| | | | |
|---|---|---|---|
| 6,169,739 B1 | 1/2001 | Isoyama | |
| 6,778,498 B2 * | 8/2004 | McDysan | 370/231 |
| 6,963,561 B1 * | 11/2005 | Lahat | 370/356 |
| 7,233,587 B2 | 6/2007 | Pattavina | |
| 7,554,994 B1 * | 6/2009 | Puon et al. | 370/401 |
| 7,586,915 B1 * | 9/2009 | Indiresan et al. | 370/392 |
| 2001/0021037 A1 * | 9/2001 | Itoh | 358/1.15 |
| 2003/0112755 A1 * | 6/2003 | McDysan | 370/230 |
| 2004/0105459 A1 * | 6/2004 | Mannam | 370/465 |
| 2005/0141504 A1 * | 6/2005 | Rembert et al. | 370/392 |
| 2006/0002423 A1 * | 1/2006 | Rembert et al. | 370/466 |

* cited by examiner

*Primary Examiner*—Hong Cho
(74) *Attorney, Agent, or Firm*—Akerman Senterfitt; Michael K. Dixon (57) ABSTRACT

Certain exemplary embodiments comprise a method that can comprise, via an Ethernet Channel Service Unit (ECSU), providing a packet conversion between a Serial Wide Area Network (WAN) protocol and an Ethernet network protocol. The ECSU can be adapted to provide access to a network service between a first device adapted to communicate using an Ethernet protocol via the Ethernet network and a second device adapted to communicate using a serial protocol via the Serial WAN.

17 Claims, 6 Drawing Sheets

- Receive Connection Request — 5100
- Obtain Address — 5200
- Receive Packets — 5300
- Provide Layer Two Conversion — 5400
- Transmit Packets — 5500
- Cause Connection Establishment — 5600

METHODS, SYSTEMS, AND/OR DEVICES FOR PROVIDING NETWORK ACCESS

CROSS-REFERENCES TO RELATED APPLICATIONS

This application claims priority to, and incorporates by reference herein in its entirety, pending U.S. Provisional Patent Application Ser. No. 60/945,316, filed 20 Jun. 2007.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments provide a method that can comprise, via an Ethernet Channel Service Unit (ECSU), providing a packet conversion between a Serial Wide Area Network (WAN) protocol and an Ethernet network protocol. The ECSU can be adapted to provide access to a network service between a first device adapted to communicate using an Ethernet protocol via the Ethernet network and a second device adapted to communicate using a serial protocol via the Serial WAN.

Figure 1:
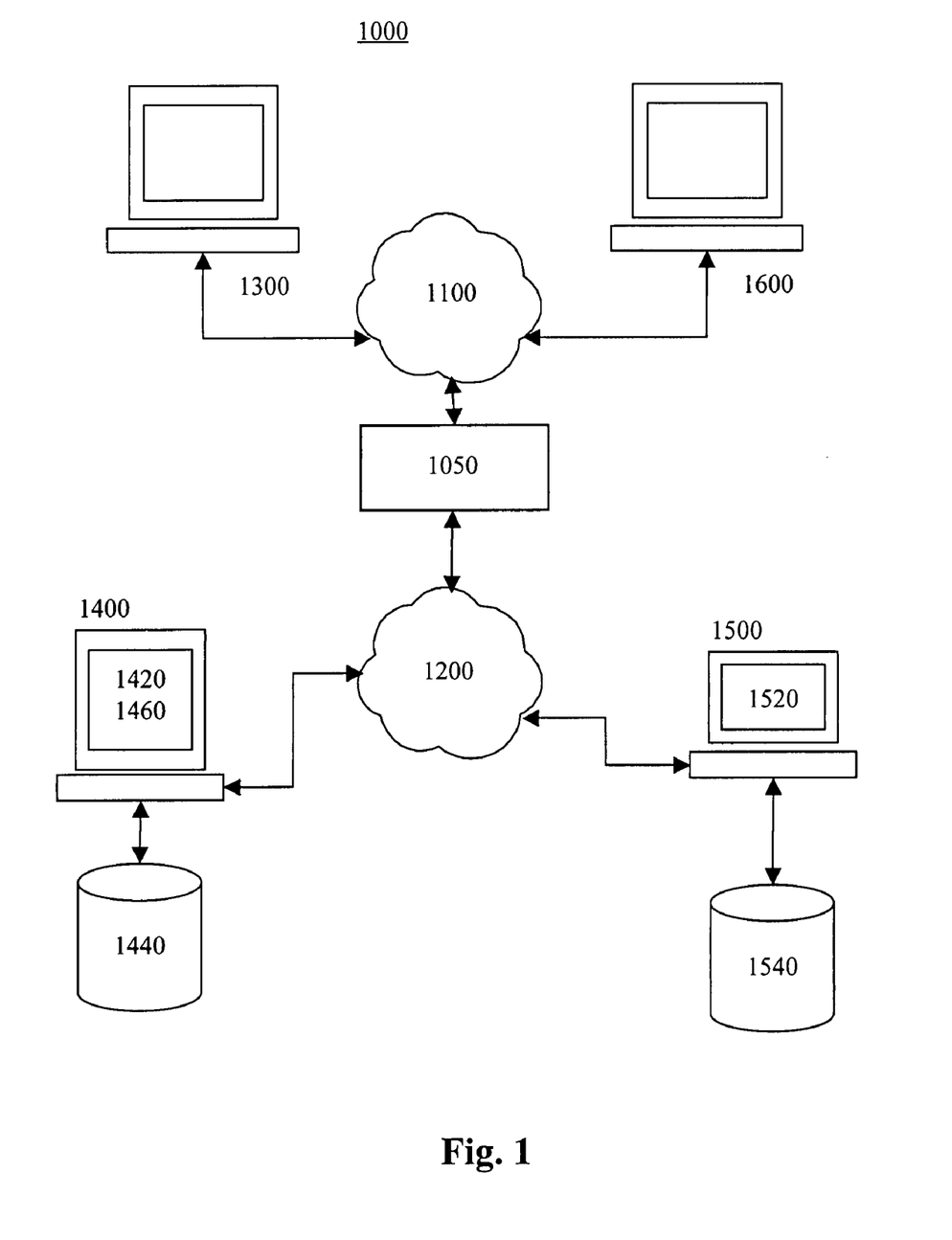
FIG. 1 is a block diagram of an exemplary embodiment of a system 1000.

FIG. 1 is a block diagram of an exemplary embodiment of a system 1000, which can comprise a first network 1100 and a second network 1200. When used herein, system means a collection of mechanisms, devices, data, and/or instructions, the collection designed to perform one or more specific functions. When used herein, a means at least one. When used herein, at least means not less than. When used herein, less than means having a measurably smaller magnitude and/or degree as compared to something else. When used herein, can means is capable of, in at least some embodiments. When used herein, comprise means to include but not be limited to. When used herein, first means an initial element of a series. When used herein, second means an element that immediately follows an initial element of a series. In certain exemplary embodiments, first network 1100 can be an Ethernet network. In certain exemplary embodiments, network 1200 can be a Serial Wide Area Network (WAN). When used herein, wide area network (WAN) means a data communications network that spans a wider radius and/or area than does a local area network. When used herein, Serial means a network adapted for serial communications. A Serial network can be a Time Division Multiplexed (TDM) network, Synchronous Optical Network (Sonet), Synchronous Digital Hierarchy (SDH), Digital Subscriber Line (DSL) and/or a High bit-rate Digital Subscriber Line (HDSL) derived circuit type. When used herein, time division multiplexed means a type of signal transmission in which two or more signals and/or bit streams are transferred apparently simultaneously as sub-channels in one communication channel, but physically are taking turns on the channel. A time domain for the channel is divided into several recurrent timeslots of fixed length, one for each sub-channel of the channel. When used herein, in means directed inward. When used herein, transmission means an electronic communication of a message. When used herein, transfer means (n) a transmission from one device, place, and/or state to another. (v) to convey from one device, place, and/or state to another.

First network 1100 can be communicatively coupled to the Serial WAN via an ECSU 1050. When used herein, via means by way of and/or utilizing. When used herein, communicatively couple means to link in a manner that facilitates communications. When used herein, Ethernet Channel Service Unit (ECSU) means a device adapted to provide, in a single device, an interface between a time division multiplexed (TDM) WAN and an Ethernet local area network (LAN). When used herein, single means existing alone or consisting of one entity. When used herein, local area network (LAN) means a data communications network that is geographically limited (typically to a 1 km radius). When used herein, interface means (n) an addressable device for communicatively coupling an entity (such as a router, server, switch, softswitch, gateway, etc.) to a packet network, the addressable device comprising hardware, firmware, and/or software, etc. The entity can have multiple interfaces, each of which can be addressable via one or more packet networks. (v) to connect with and/or interact with by way of an interface. When used herein, switch means (n) a mechanical, electrical, and/or electronic device that opens and/or closes circuits, completes and/or breaks an electrical path, and/or selects paths and/or circuits and/or a device that establishes a connection between disparate transmission path segments in a network (or between networks). (v) to electrically energize or de-energize.

When used herein, router means a device adapted to direct traffic and/or determine the next network point to which a data packet should be forwarded enroute toward its destination. The router is connected to at least two networks and determines which way to send each data packet based on its current understanding of the state of the networks it is connected to. Routers create or maintain a table of the available routes and use this information to determine the best route for a given data packet. Examples include a router, route-reflector, route server, server-based router, router-switch, sets of routers, and/or intra-networking devices, etc. A typical router operates at least at the bottom 3 layers (Physical, Link, and Network layers) of the OSI model. When used herein, send means to convey. When used herein, not means a negation of something. When used herein, one means a single entity. When used herein, packet means a generic term for a bundle of data organized in a specific way for transmission, such as within and/or across a network, such as a digital packet-switching network, and comprising the data to be transmitted and certain control information, such as a destination address. When used herein, provide means to furnish, supply, give, convey, send, and/or make available. When used herein, transmit means to provide, furnish, supply, send as a signal, and/or to convey (e.g., force, energy, and/or information) from one place and/or thing to another.

When used herein, with means accompanied by. When used herein, more means greater in size, amount, extent, and/or degree. When used herein, size means physical dimensions, proportions, magnitude, amount, and/or extent of an entity. A plurality of information devices, such as first information device 1300, second information device 1600, server 1400, and server 1500 can be communicatively coupled via first network 1100 and second network 1200. When used herein, plurality means the state of being plural and/or more than one. Server 1400 can comprise a user interface 1420, a memory device 1440, and a user program 1460. Server 1500 can comprise a user interface 1520 and a memory device 1540. Each of server 1400 and server 1500 can be adapted to provide content to first information device 1300 and/or second information device 1600 responsive to one or more user requests. When used herein, content means substance and/or substantive portion of a packet. When used herein, each means every one of a group considered individually. When used herein, request means (v.) to express a need and/or desire for; to inquire and/or ask for. (n.) that which communicates an expression of desire and/or that which is asked for. When used herein, responsive means reacting to an influence and/or impetus Via ECSU 1050, without examining data payloads or layer three packet headers of packets, a layer two packet conversion can be provided between a Serial Wide Area Network (WAN) protocol and an Ethernet network protocol. When used herein, without means not accompanied by. When used herein, payload means the data portion of a packet. When used herein, protocol means a formal description of message formats and rules that two information devices follow in order to exchange information. When used herein, packet header means a data field at a beginning of a block of data being stored or transmitted, the data field adapted to include information regarding a source and a destination of the block of data. When used herein, store means to place, hold, retain, enter, and/or copy into and/or onto a machine-readable medium. When used herein, regarding means pertaining to. When used herein, Ethernet means a frame-based computer networking technology for local area networks (LANs). Ethernet defines wiring and signaling for the physical layer, and frame formats and protocols for the media access control (MAC)/data link layer of the OSI model. When used herein, for means with a purpose of.

When used herein, layer two packet conversion means a conversion of packets from a first protocol to a second protocol without utilizing central office equipment that is adapted to provide packet conversion in a manner that examines data payloads or layer three packet headers of each packet, the packet conversion provided without utilizing Ethernet bridging equipment that is adapted to provide the packet conversion in a manner that examines data payloads or layer three packet headers of each packet. When used herein, layer three means a layer in the OSI model that provides switching and/or routing. For example, the network layer can provide logical paths, known as virtual circuits, for transmitting data from node to node. When used herein, logical means a conceptual representation. When used herein, node means an information device coupled to a network. Functions of this layer can include routing, forwarding, addressing, internetworking, error handling, congestion control, and/or packet sequencing. When used herein, utilize means to use and/or put into service.

When used herein, network means a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof. When used herein, non means not.

When used herein, network interface means any physical and/or logical device, system, and/or process capable of coupling an information device to a network. When used herein, process means (n.) an organized series of actions, changes, and/or functions adapted to bring about a result. (v.) to perform mathematical and/or logical operations according to programmed instructions in order to obtain desired information and/or to perform actions, changes, and/or functions adapted to bring about a result. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device. When used herein, other means not the same as already mentioned and/or implied.

When used herein, data means information represented in a form suitable for processing by an information device. When used herein, between means in a separating interval and/or intermediate to. When used herein, examine means analyze, consider in detail, observe, check out, look over carefully, and/or inspect. When used herein, over means with reference to. When used herein, Media Access Control (MAC) address means a unique code assigned to a network device and/or interface at data link layer of the OSI model. ECSU 1050 can be adapted to switch packets between an Ethernet VLAN associated with first network 1100 and a WAN bundle associated with second network 1200. When used herein, associated with means related to. When used herein, virtual local area network (VLAN) means a logical grouping of two or more nodes which are not necessarily on a same physical network segment but which share a same network identification. When used herein, adapted to means suitable, fit, and/or capable of performing a specified function. When used herein, perform means to begin, take action, do, fulfill, accomplish, carry out, and/or complete, such as in accordance with one or more criterion. When used herein, and/or means either in conjunction with or in alternative to. When used herein, bundle means (n) a plurality of aggregated elements. (v) to aggregate. When used herein, function means a defined action, behavior, procedure, and/or mathematical relationship. When used herein, information means facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

Described herein are certain exemplary embodiments of methods, machine instructions, and/or devices that can provide transparent Ethernet access across traditional time division multiplexed (TDM) based hardware, thereby providing sub T1/E1, NxT1/E1, T3/E3, NxT3/E3, Digital Subscriber Line (DSL) and/or OCX/STMX access speeds to the customer while presenting the customer with an Ethernet handoff (physical link and data link protocol connection). When used herein, transparent means performed in a substantially undetectable manner. When used herein, thereby means because of. When used herein, speed means a rate at which information is transmitted via one or more links. When used herein, access means (n) a permission, liberty, right, mechanism, or ability to enter, approach, communicate with and/or through, make use of, and/or pass to and/or from a place, thing, and/or person. (v) to enter, approach, communicate with and/or through, make use of, and/or pass to and/or from. When used herein, through means in one side and out another side of. When used herein, communicate means to exchange information. When used herein, device means a machine, manufacture, and/or collection thereof When used herein, enter means to come and/or flow into.

The methods of certain exemplary embodiments can be implemented via machine instructions, software, firmware, and/or hardware residing in and/or on one or more devices, such as an information device, memory device, customized Router, network provider equipment (NPE), and/or Channel Service Unit (CSU), etc., any of which can be transparent to the customer—meaning the device need not be apparent to a node communicating therethrough. When used herein, channel means a defined passage, conduit, and/or groove for conveying a frequency, wavelength, and/or code value and/or range associated with the transmission of one or more communication signals. When used herein, communication means a transmission and/or exchange of information. Certain exemplary embodiments of these methods, machine instructions, and/or devices (for convenience, collectively referred to herein as "Ethernet CSU" and/or "ECSU") can allow point-to-point access over single and/or multiple bonded TDM circuits from the customer premise to the network via a customer facing Ethernet interface. When used herein, point-to-point means one or more network transmissions between only two entities. When used herein, multiple bonded communications link means a communications link that logically aggregates a plurality of physical links to transmit a message. When used herein, allow means to provide, let do, happen, and/or permit. When used herein, circuit means an electrically conductive pathway and/or a communications connection established across two or more switching devices comprised by a network and between corresponding end systems connected to, but not comprised by the network. When used herein, comprised by means included by. When used herein, define means to establish the meaning, relationship, outline, form, and/or structure of; and/or to precisely and/or distinctly describe and/or specify. When used herein, from means used to indicate a source.

Because customers can already use Ethernet in their Local Area Network (LAN), protocol conversion might be unnecessary and utilizing ECSUs can allow the customer to have a consistent access architecture across all sites. When used herein, all means every one of a set. Providing an Ethernet handoff can allow customers to use existing LAN-based hardware for WAN access, thereby potentially eliminating the requirement for costly equipment to support TDM/Sonet router interfaces or CSU/DSU interfaces. When used herein, support means to provide one or more sub-functions that enable performance of a function.

TDM access can be provided by a TDM Channel Service Unit (CSU) which can provide a serial interface in to a serial interface out. The CSU might not provide layer two protocol conversion. A device can be provided between the customer LAN and the CSU to map between Ethernet and Serial. When used herein, map means to determine an address according to a first protocol based upon an associated address according to a second protocol. In certain exemplary embodiments, the CSU function can be performed using an IP router which might not provide a transparent Ethernet handoff to the customer and might not provide a cost effective solution due to the higher cost of IP routers. An ECSU can provide a method for cost effective Ethernet to TDM conversion that can provide the customer with a transparent Ethernet handoff and a direct layer two connection between the customer device and the layer three service edge. When used herein, direct means without any intervening element.

The ECSU can provide customers with an Ethernet connection to a layer three network via traditional TDM circuits without having to deploy additional vendor equipment in a Central Office (CO). When used herein, central office means a telephone company building where subscriber's lines are joined to switching equipment for connecting to each other and/or other subscribers, locally and long distance. In fact, the ECSU can make the Ethernet handoff at the customer transparent to a TDM and/or backbone network service provider's edge network—as a result certifying, deploying, and/or supporting new equipment might be unnecessary. When used herein, remove means to eliminate, remove, and/or delete, and/or to move from a place or position occupied. When used herein, backbone network means a "transit" network often made up of long-distance telephone trunk lines and/or other wired and/or wireless links such as microwave and satellite links for use in transmitting large amounts of data simultaneously between host computer systems connected to the Internet. When used herein, link means a physical and/or logical communication channel between a pair of switching and/or routing devices; and/or an activateable connection to another web page, location in a web page, file, and/or other Internet resource. Normal communicated data typically neither originates nor terminates in a backbone network. The ECSU can provide a method to turn a CPE router-based platform and/or a traditional CSU into an "Ethernet Channel Service Unit" device that can provide WAN speeds ranging from 56 K/64 K/sec to 100 Gigabit/sec using the existing TDM infrastructure/PTT or Telco services. When used herein, gigabits per second means a count of the billions of bits transferred in a period of one second. The Ethernet handoff on the customer side can be standard 10/100/1000/10000 megabits per second (MB/s), with an ability to scale to future Ethernet speeds. When used herein, megabits per second means millions of bits transferred in a time of a second. Rate shaping techniques can be used on the ECSU to map traffic from the customer LAN to the outgoing WAN speed. When used herein, rate means (n) an amount of change occurring, typically during a predetermined time period. (v) to establish a nominal and/or expected performance of.

The ECSU can provide a legacy 10/100/1000/10000 MB/s point-to-point Ethernet (or any speed that the Ethernet might be clocked) connection to the customer. The connection can be via an X21, V35, or Optical type serial interface of a CSU. The ECSU can support multiple wide area TDM based technologies such as DSL, sub T1/E1, T1/E1, and/or OCx/STMx. The ECSU can operate at layer two of the Open Systems Interconnection (OSI) reference model while mapping inbound Internet Protocol (IP) data frames from the Ethernet payload into the appropriate WAN encapsulation payload. When used herein, encapsulate means to embed a packet into another packet of the same or different kind. When used herein, encapsulation means a placement of a packet into another packet of the same or different kind. When used herein, Internet Protocol (IP) means a network protocol that specifies the format of packets, also called datagrams, and the addressing scheme for the packets. By itself, IP is a protocol for providing a message from a source to a network, but does not establish a direct link between the source and the destination. TCP/IP, on the other hand, can establish a connection between two communicators so that they can send messages back and forth for a period of time.

Figure 2:
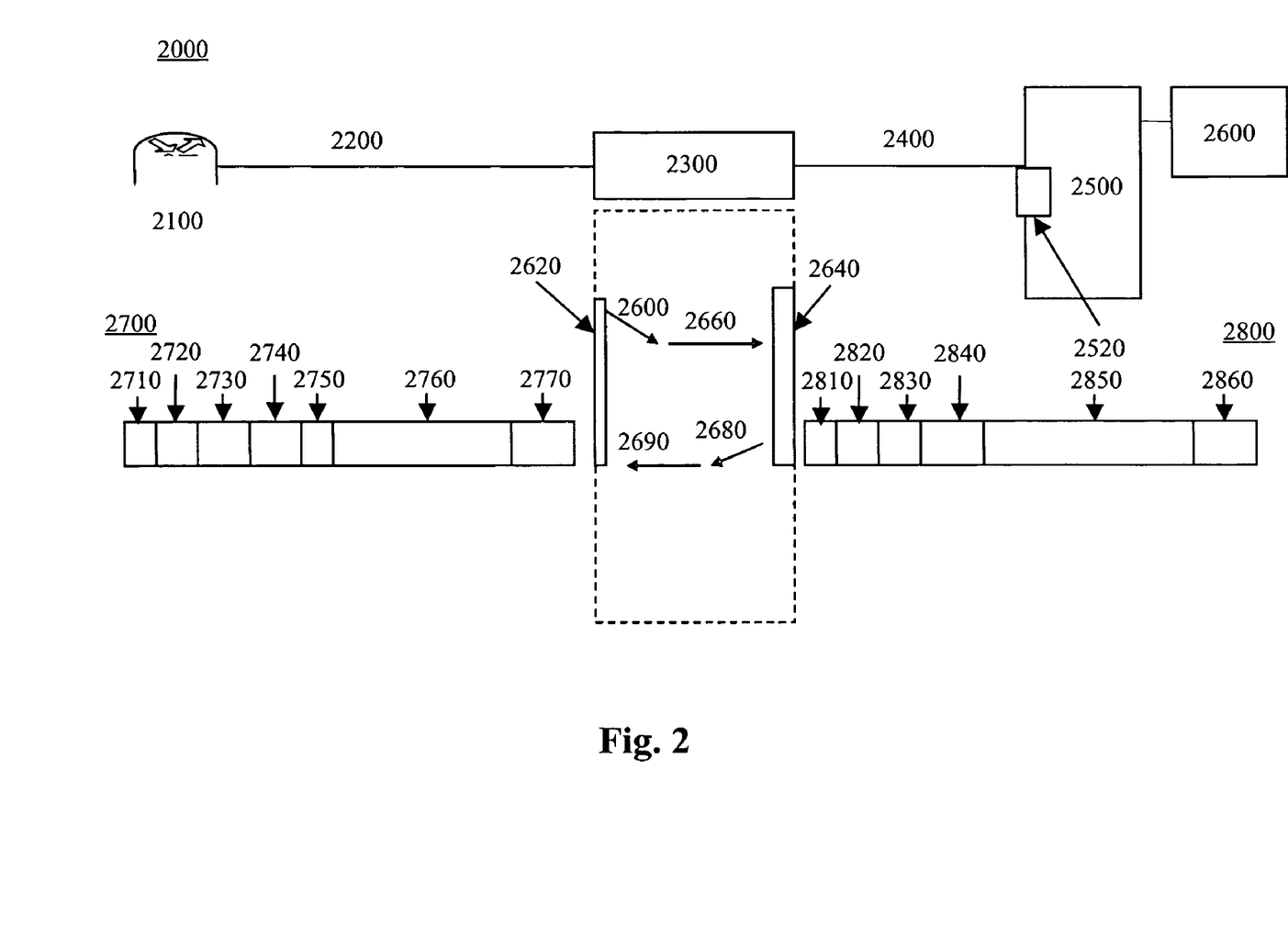
FIG. 2 is a block diagram of an exemplary embodiment of a system and method 2000.

FIG. 2 is a block diagram of an exemplary embodiment of a system and method 2000, which can comprise an Ethernet network router 2100. Ethernet network router 2100 can be adapted to communicatively couple information devices of the Ethernet network to a Serial WAN via point-to point Ethernet link 2200, ECSU 2300, DS3 link 2400, Gigabit Switch Router (GSR) interface 2520, GSR 2500, and Provider Edge (PE) router 2600. When used herein, Provider Edge device means a device in a Provider network communicatively coupled to a device in a Customer network.

An Ethernet frame provided according to Ethernet frame structure 2700 can be transmitted to Ethernet interface 2620 of ECSU 2300 via Ethernet network router 2100. Ethernet frame structure 2700 can comprise a preamble 2710, a start-of-frame delimiter field 2720, a destination media access control (MAC) address field 2730, a source MAC address field 2740, a type field 2750, a data payload field 2760, and a frame check sequence field (FCS) 2770. When used herein, address means (n.) one or more identifiers, such as one or more symbols, characters, names, and/or numbers, used for identification in information transmission, storage, and/or retrieval, the one or more identifiers assignable to a specific physical, logical, and/or virtual machine, process, node, object, entity, record, data element, component, port, interface, location, link, route, circuit, and/or network; (v.) to locate, access, assign, and/or provide an identifier a specific physical, logical, and/or virtual machine, process, node, object, entity, record, data element, component, port, interface, location, link, route, circuit, and/or network. When used herein, entity means something that exists as a particular and discrete unit. When used herein, field means a logical storage space for a type of data. A field can contain textual, numeric, date, graphical, audio, video, animated, and/or calculated data. A field can have properties comprising a fixed or variable length, a pre-defined display format, validation properties, and/or relatability to another field.

ECSU 2300 can receive the Ethernet frame at Ethernet interface 2620, can remove a layer two at activity 2600, can switch the frame to a DS3 compatible frame in a DS3 compatible frame structure, and can provide the DS3 compatible frame 2800 (e.g., a Point-to-Point Protocol (PPP) frame) to a Serial WAN interface 2640 at activity 2660. When used herein, receive means to gather, take, acquire, obtain, accept, get, and/or have bestowed upon. DS3 compatible frame structure 2800 can comprise a flag field 2810, an address field 2820, a control byte field 2830, a protocol field 2840, a data payload field 2850, and FCS field 2860. When used herein, assign means to designate, appoint, allot, and/or attribute, and/or to select and set apart for a particular purpose.

A DS3 frame structured according to DS3 compatible frame structure 2800 from the Serial WAN can be received at Serial WAN interface 2640, can be switched to an Ethernet frame structure 2700 at activity 2680, can be mapped with layer two Ethernet information to Ethernet frame at activity 2690, and can be provided to Ethernet interface 2620 for transmission to the Ethernet network. Activities taking place within ECSU 2300 can take place without examining and/or changing the layer three content of frames converted between the Ethernet network and the Serial WAN. When used herein, change means (v.) to cause to be different; (n.) the act, process, and/or result of altering or modifying. When used herein, convert means to transform.

ECSU 2300 need not interpret the IP payload of the packets in order to determine an egress interface. When used herein, determine means to obtain, calculate, decide, deduce, establish, and/or ascertain. When used herein, obtain means to receive, get, take possession of, procure, acquire, calculate, determine, and/or compute. Instead ECSU 2300 can logically map an ingress LAN logical and/or physical interface to an outbound WAN logical and/or physical interface. The ECSU can provide customers with an Ethernet connection to a layer three network over traditional xDSL connection without the need for an additional layer three hub, network bridging configuration, and/or additional IP address translation. ECSU 2300 can turn an xDSL CPE router or bridge into a transparent "Ethernet Channel Service Unit" device that can provide Ethernet access using the existing xDSL services. When used herein, bridging means transmitting via a device that links LANs together, allowing data designated for one LAN to pass through from one to another. When used herein, pass through means travel in and out of. Although in certain exemplary embodiments, ECSU 2300 might not interpret Layer three packet information, such interpretation can be added and/or included to provide more value-added functionality, such as via an ability for ECSU 2300 to provide services such as security, data/performance monitoring capabilities, and/or application visibility. When used herein, add means to combine.

The WAN layer two access can be any serial protocol, including but not limited to, Frame/Multilink Frame Relay (ML-FR), PPP/Multilink PPP (MLPPP), Layer 2 Tunneling Protocol (L2TP), Point-to-Point Tunneling Protocol (PPTP), Internet Protocol Security (IPSec), Asynchronous Transfer Mode (ATM)/Inverse Multiplexing over ATM (IMA) or X.25. The WAN layer two connections terminate on existing equipment in the CO.

Figure 3:
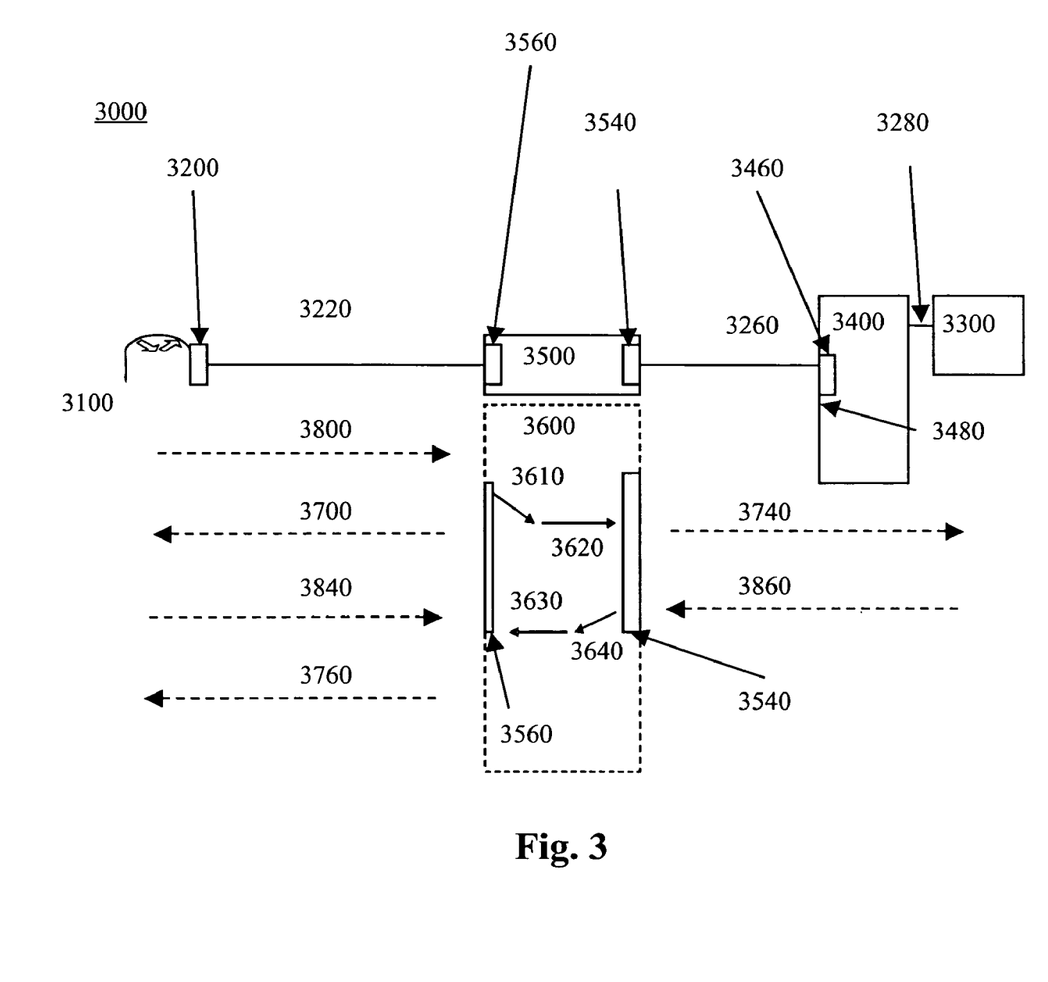
FIG. 3 is a block diagram of an exemplary embodiment of a system and method 3000.

FIG. 3 is a block diagram of an exemplary embodiment of a system and method 3000, which can comprise an Ethernet network router 3100 with an Ethernet interface 3200. Ethernet interface 3200 can be associated with an IP address (e.g., 192.1.1.2/30). Ethernet network router 2100 can be adapted to communicatively couple information devices of the Ethernet network to a Serial WAN via point-to point Ethernet link 3220, ECSU Ethernet interface 3560, ECSU 3500, ECSU Serial WAN interface 3540, DS3 link 3260, GSR interface 3460, GSR 3400, and Provider Edge (PE) router 3300. ECSU 3500 can be adapted to run in a promiscuous mode in which all packets received by ECSU 3500 are processed by ECSU 3500. When used herein, promiscuous mode means adapted to process all received packets rather than just packets having a predetermined address. When used herein, rather means on the contrary. In certain exemplary embodiments, ECSU Ethernet interface 3560 and/or ECSU Serial WAN interface 3540 might not be assigned an IP address. ECSU 3500 can be adapted to learn remote MAC addresses and can be adapted to respond to Address Resolution Protocol (ARP) requests. When used herein, resolution means determination. When used herein, Address Resolution Protocol (ARP) means a data structure adapted for use to find an OSI model data link layer address based upon a network layer address of the node. When used herein, based means being derived from. When used herein, based upon means determined in consideration of and/or derived from. When used herein, data structure means an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

A packet transmission 3800 can comprise an ARP request from Ethernet network router 3100 for an exemplary IP address of GSR interface 3460, such as 192.1.1.1. ECSU 3500 can be adapted to respond to the ARP request with a response packet transmission 3700, which can comprise a MAC address assigned by ECSU 3500 and mapped to the exemplary IP address. Ethernet network router 3100 can transmit an Ethernet frame compatible packet transmission 3840, via the Border Gateway Protocol (BGP) to an ECSU Ethernet interface 3560. Ethernet frame compatible packet transmission 3840 can comprise an exemplary source address (e.g., 192.1.1.2) and a destination address that corresponds to the exemplary IP address. Ethernet frame compatible packet transmission 3840 can have Ethernet layer two information removed at activity 3610. Ethernet frame compatible packet transmission 3840 can be converted to a PPP packet 3740 at activity 3620 without examining and/or changing layer three frame content. PPP packet transmission 3740 can be transmitted to GSR 3400, which can provide the packet to the Serial WAN.

A packet transmission 3860 can be transmitted from an information device communicatively coupled to the Serial WAN to an information device communicatively coupled to the Ethernet Network. Packet transmission 3860 can be provided to ECSU Serial WAN interface 3540. At activity 3640, packet transmission 3860 Serial WAN layer two information can be removed and/or analyzed. At activity 3630, packet transmission 3860 can be converted to an Ethernet packet 3760 that can comprise a MAC address mapped by the ECSU based upon the source address of packet 3860. When used herein, address map means a logical association of values indicative of an information device location according to a first communication protocol with values indicative of the information device location according to a second communication protocol. Ethernet packet transmission 3760 can be transmitted to the Ethernet network via ECSU Ethernet interface 3560.

Figure 4:
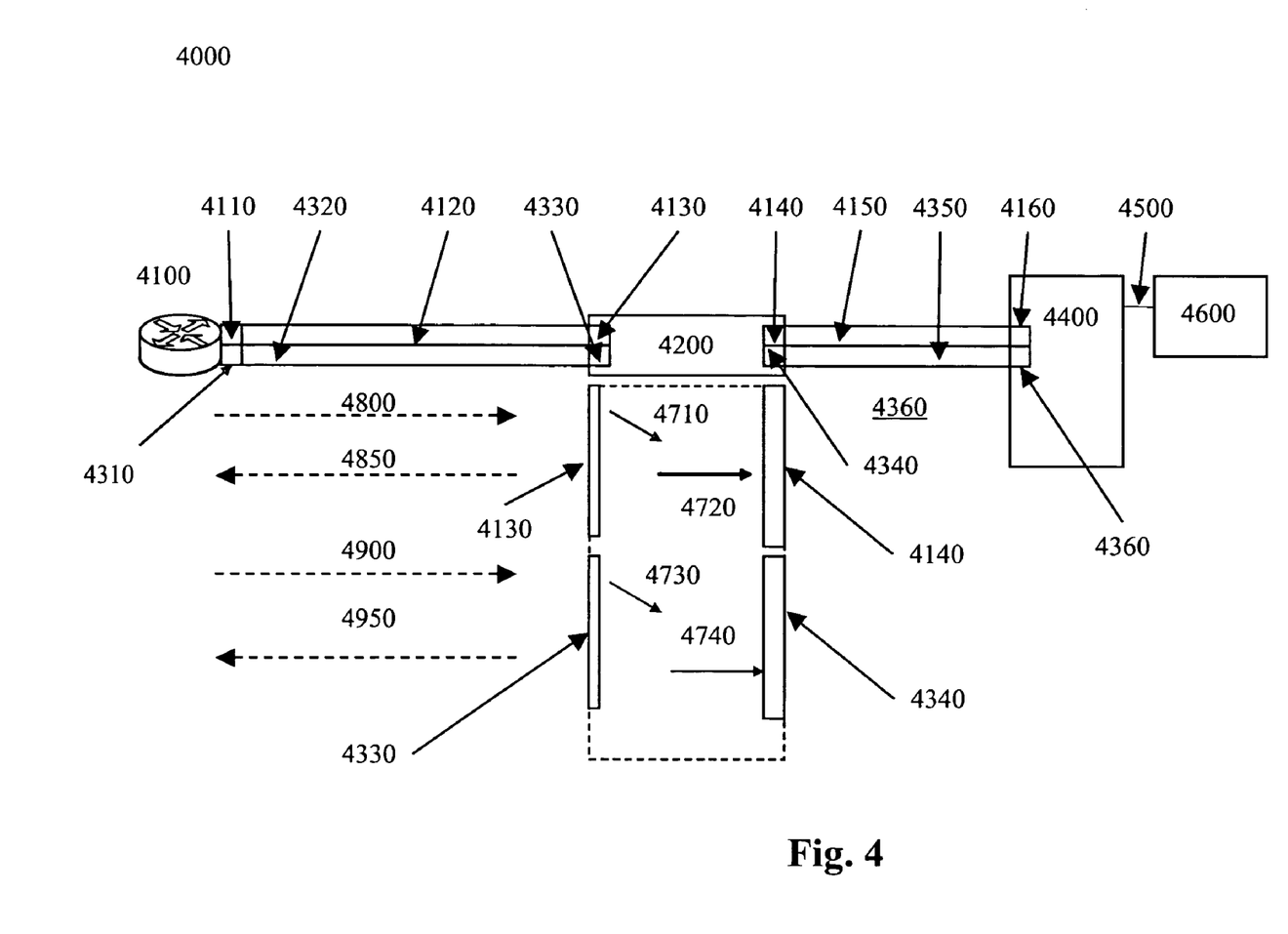
FIG. 4 is a block diagram of an exemplary embodiment of a system and method 4000.

FIG. 4 is a block diagram of an exemplary embodiment of a system and method 4000, which can comprise an Ethernet network router 4100 with a first Ethernet interface 4110 and a second Ethernet interface 4310. First Ethernet interface 4110 can be associated with a first IP address (e.g., 191.1.1.2/30). Second Ethernet interface 4310 can be associated with a second IP address (e.g., 192.1.1.6/30). Ethernet network router 4100 can be adapted to communicatively couple information devices of the Ethernet network to a Serial WAN via first Ethernet interface 4110, a first Virtual Local Area Network (VLAN) 4120, a first ECSU Ethernet interface 4130, ECSU 4200, a first ECSU Serial WAN interface 4140, a first Data Link Connection Identifier (DLCI) 4150, first GSR interface 4160, GSR 4400, WAN link 4500, and Provider Edge (PE) router 4600. Ethernet network router 4100 can be adapted to communicatively couple information devices of the Ethernet network to a Serial WAN via second Ethernet interface 4310, a second Virtual Local Area Network (VLAN) 4320, a second ECSU Ethernet interface 4330, ECSU 4200, a second ECSU Serial WAN interface 4340, a second Data Link Connection Identifier (DLCI) 4350, second GSR interface 4360, GSR 4400, WAN link 4500, and Provider Edge (PE) router 4600. ECSU 4200 can be adapted to run in a promiscuous mode in which all packets received by ECSU 4200 are processed by ECSU 4200. In certain exemplary embodiments, first DLCI 4150 and second DLCI 4350 can be logical frame DLCIs within a DS3 link. ECSU 4200 can be adapted to learn remote MAC addresses and can be adapted to respond to Address Resolution Protocol (ARP) requests.

In certain exemplary embodiments, a packet transmission 4800 can comprise a first ARP request from Ethernet network router 4100 for an exemplary IP address of first GSR interface 4160, such as 192.1.1.1. ECSU 4200 can be adapted to respond to the ARP request with a response packet transmission 4850, which can comprise a MAC address assigned by ECSU 4200 and mapped to the exemplary IP address of first GSR interface 4160. Ethernet network router 4100 can transmit a packet transmission 4900 can comprise a second ARP request from Ethernet network router 4100 for an exemplary IP address of second GSR interface 4360, such as 192.1.1.5. ECSU 4200 can be adapted to respond to the ARP request with a response packet transmission 4950, which can comprise a MAC address assigned by ECSU 4200 and mapped to the exemplary IP address of second GSR interface 4360.

Packets transmitted from Ethernet network router 4100 via first VLAN 4120 can enter ECSU 4200 via a first logical interface 4130. At activity 4710 level two information can be examined and/or removed from the packets. At activity 4720 the packets can be converted to packets compatible with the Serial WAN without examining and/or changing layer three packet content. The converted packets can be transmitted via first ECSU Serial WAN interface 4140, first DLCI 4150 and first GSR interface 4160 to GSR 4400.

Packets transmitted from Ethernet network router 4100 via second VLAN 4320 can enter ECSU 4200 via a second logical interface 4330. At activity 4730 level two information can be examined and/or removed from the packets. At activity 4740 the packets can be converted to packets compatible with the Serial WAN without examining and/or changing layer three packet content. The converted packets can be transmitted via second ECSU Serial WAN interface 4340, second DLCI 4350 and second GSR interface 4360 to GSR 4400.

Thus, ECSU 4200 can support both a single Ethernet segment and/or multiple Ethernet segments of a single Ethernet physical Interface using VLANs. When VLAN support is enabled, the ECSU can map the appropriate incoming VLAN to a logical sub-interface of WAN side. When used herein, sub-interface means a logical portion of an interface. This mapping can be dynamic in that as the logical sub-interfaces are defined, the associated VLANs on the Ethernet port can be enabled.

Certain exemplary embodiments can provide methods, machine instructions, and/or devices that can be adapted to:

provide an Ethernet handoff to the customer using serial based access without requiring concentration/conversion equipment to be deployed in a central office and/or not utilizing Ethernet bridging technology. A Serial WAN can be TDM/Sonet/SDH/DSL and any HDSL derived circuit types. Ethernet speeds ranging from 1 megabits per second (MBPS) to 10 gigabits per second (GBPS) can be supported;

allow point-to-point serial access to a layer three service edge utilizing Ethernet at the customer premise going directly into a Serial WAN interface. The point-to-point serial access can be over a single communication link or multiple bonded communication links from the customer premises to the carrier layer three network. When used herein, communications link means an established communication channel. Utilizing an ECSU the customer might not utilize an additional layer three device to convert packets between Ethernet and Serial WAN networks;

provide point-to-point Ethernet access to a TDM and/or backbone network service provider's Internet and/or Virtual Private Network (VPN) service for speeds up to 10000 MBPS (or available Ethernet Speeds) with no changes to an existing infrastructure;

provide transparent Ethernet to Serial layer two protocol conversion and/or mapping without examining the IP (layer three) packet data content;

intelligently map virtual local area networks (VLANs) to logical sub-interfaces on wide area network (WAN) access circuits and thereby support multiple VLANs on a customer access side. When used herein, intelligently mapping means based upon information and/or predetermined decision making criteria, determining a network address. When used herein, predetermined means established in advance;

provide a switching and/or policy-based function that can allow the ECSU to switch any packets exchanged between the Ethernet interface/VLAN and the WAN bundle. When used herein, point-to-point means one or more network transmissions between only two entities;

provide an advanced Operation Administration and Maintenance (OAM) capability to offer a relatively high availability for Ethernet services;

support layer two bundling technologies on a CSU, in order to provide link aggregation to support various access speeds. When used herein, link aggregation means a grouping of multiple network links into one logical link;

provide an Ethernet handoff to the customer supporting speeds from 1-10,000 MB/s without requiring concentration equipment to be deployed in the central office and/or not requiring bridging technology;

a switch and/or policy based function that can allow the ECSU to switch any packets coming in thru the Ethernet interface out to the WAN bundle and/or vice versa without requiring a layer three lookup. When used herein, out means directed away from;

prevent the ECSU from decrementing the IP time to live (TTL) field or any fields with in the IP header of a packet as the packet passes thru the ECSU, which can provide transparency so that the underlining IP protocols are not affected. When used herein, decrement means to reduce in incrementally in value. When used herein, time to live (TTL) means a value that exists in a header of each IP packet that is decremented when a packet crosses a router;

provide IP to Media Access Control (MAC) resolution for customer premises equipment (CPE) connected to the ECSU, which can be implemented using a proxy address resolution protocol (ARP) like function but is not limited to proxy ARP. When used herein, proxy means an entity acting as a substitute for a separate and distinct entity. Thereby, the ECSU can be transparent, so to the customer's CPE can appear as if it is on the same local area network (LAN) segment as the provider edge router. The customer's CPE can utilize an ARP request to resolve the provider edge (PE) IP address so the ECSU can proxy that ARP request;

participate, on the WAN side, in the layer two keepalive protocol including, but not limited to, PPP keep alives, Frame Relay LMI, and Bi-directional Forwarding (BFD);

support a promiscuous mode whereby the ECSU can process all received packets on the Ethernet interface rather than just packets addressed to the ECSU. Thereby enabling the device to read substantially all packets being sent on the wire. When used herein, just means merely;

provide dynamic traffic shaping and/or rate limiting function on the Ethernet interface to match the speed of the WAN bundle. When used herein, match means (n) one that fits, meets, resembles, harmonizes, find a counterpart to, and/or corresponds in one or more attributes. (v) to mirror, resemble, harmonize, fit, correspond, and/or determine a correspondence between, two or more values, entities, and/or groups of entities;

provide dynamic flow control to the downstream Ethernet element based on current available WAN bandwidth (i.e. a mechanism to dynamically check the link bundle bandwidth and adjust downstream element based on speed changes). When used herein, adjust means to change so as to match, fit, adapt, conform, and/or be in a more effective state;

dynamically determine the link bundle size and/or recalculate that bundle size when links are added and/or removed from the bundle or become unusable in the bundle based on a high bit error rate calculation. When used herein, dynamically means on demand or as necessary. When used herein, recalculate means to repeat a predetermined calculation;

allow the bundled WAN interface to be unnumbered (i.e., not having an assigned IP address);

dynamically detect the WAN IP address of the upstream provider edge device and using the information to dynamically assign an address to the ESCU Ethernet interface and the downstream network device. When used herein, upstream means between a source of the airflow and the critical zone. The source can be, for example, a hood, a duct, an outlet, a diffuser, and/or a filter, etc. that directs the airflow at the critical zone. When used herein, detect means to sense, perceive, identify, discover, ascertain, respond to, and/or receive the existence, presence, and/or fact of;

intercept packets going to a certain IP address in order to provide an in-band management function. When used herein, intercept means to take, seize, and/or halt; and/or dynamically allocate and/or associate WAN logical interfaces with customer facing VLANs.

The Ethernet Channel Service Unit (ECSU), which can be implemented in machine instructions and/or telecommunication devices can convert packets at layer two to provide transparent/direct Ethernet access across traditional TDM-based hardware. The ECSU can operate at layer two of the Open Systems Interconnection (OSI) reference model.

Via certain exemplary embodiments, there can be:

no need for bandwidth aggregation units at the Central Office;

no "extra protocol" between customer device and the Central Office;

direct communication with layer three Provider Edges;

intelligent device at customer premises that allows for bandwidth shaping;

elimination of any need for a customer router behind the service provider's device;

relatively efficient use of WAN bandwidth by utilizing a small header (6 bytes) for a serial protocol versus Ethernet (18 bytes) plus a bridged header (12 bytes); and/or Simple Network Management Protocol (SNMP) monitoring to assist in troubleshooting. When used herein, assist means to give help or support to.

Figure 5:
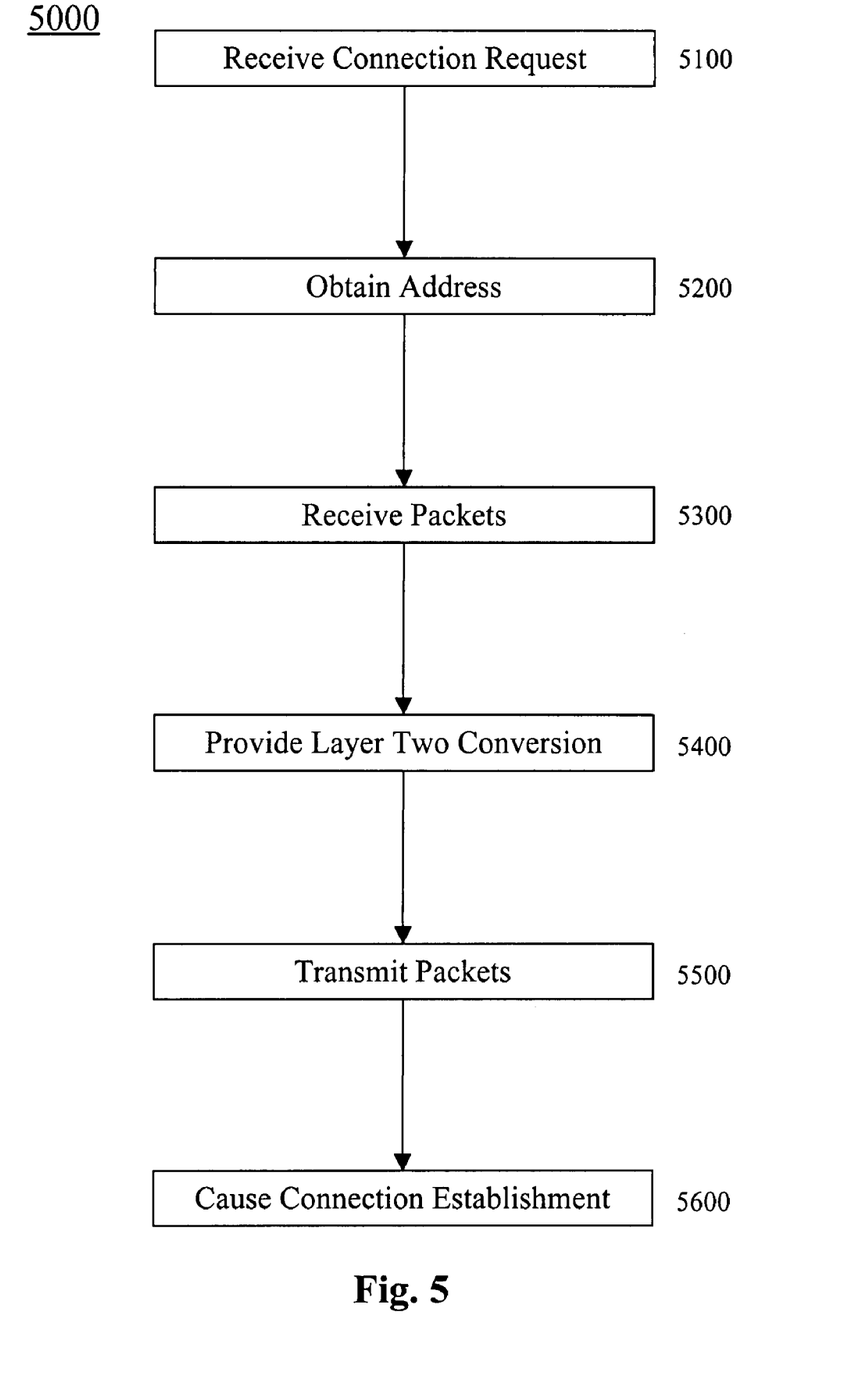
FIG. 5 is a flowchart of an exemplary embodiment of a method 5000.

FIG. 5 is a flowchart of an exemplary embodiment of a method 5000. When used herein, method means a process, procedure, and/or collection of related activities for accomplishing something. Any single activity and/or subset of activities comprised by method 5000 can be performed manually or automatically. When used herein, automatically means acting and/or operating in a manner essentially independent of external human influence and/or control. For example, an automatic light switch can turn on upon "seeing" a person in its view, without the person manually operating the light switch. Any single activity and/or subset of activities comprised by method 5000 can be performed via machine instructions therefor comprised by a machine-readable medium. When used herein, activity means an action, act, deed, function, step, and/or process and/or a portion thereof. When used herein, machine instructions means directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software. When used herein, machine-readable medium means a physical structure from which a machine, such as an information device, computer, microprocessor, and/or controller, etc., can obtain and/or store data, information, and/or instructions. Examples include memories, punch cards, and/or optically readable forms, etc.

At activity 5100, a connection request can be received to communicatively couple a first device adapted to communicate using the Ethernet network protocol via an Ethernet network and a second device adapted to communicate using the Serial Wide Area Network (WAN) protocol via a Serial WAN. The request can be initiated by the first device and/or the second device.

At activity 5200, the ECSU can obtain an address of the second device. The address of the second device can be obtained via a proxy address resolution request. The ECSU can be adapted to associate information received responsive to the proxy address resolution request to a logical MAC address assigned by the ECSU to an interface associated with the second device.

At activity 5300, packets can be received at the ECSU. The packets can be formatted according to a Serial Wide Area Network (WAN) protocol from the second device and/or an Ethernet network protocol from the first device.

At activity 5400, the packets can be converted, via the ECSU. The packets can be converted without examining data payloads or layer three packet headers of packets. The layer two packet conversion can be provided between the Serial Wide Area Network (WAN) protocol and the Ethernet network protocol. The ECSU can be adapted to provide point-to-point access to a layer three network service between the first device and the second device. The point-to-point access can be provided without examination of the data payloads or the layer three packet headers. The point-to-point access can be via a single communications link and/or at least one multiple bonded communications link.

When used herein, layer three network service means a connection-less network service whereby no circuit or virtual circuit needs to be established between sender and receiver before information is conveyed. Layer three network services can include:

IP Internet Service: a service that can provide access to the public "Internet", which is a worldwide collection of computer networks cooperating with each other to exchange data using common networking and software standards. IP Internet Service can allow information devices at a customer's first site to communicate with information devices at the customer's second site, and can allow information devices at a customer's site to access any of the services, applications, and/or sites that connect to the Internet regardless of geographic location or a local service provider used.

IP based VPN services such as Virtual Router VPN services, Border Gateway Protocol/Multi-Protocol Label Switching (MPLS) VPN services, and/or MPLS/IP VPN Services. MPLS/IP VPN Services can offer customers secure, any-to-any communication over a shared service provider's RFC 2547- and/or MPLS/IP VPN Services-based backbone network. MPLS/IP VPN Services can provide customers the benefits of IP-based any-site-to-any-site connection-less Class of Service capabilities that provide the ability to manage and prioritize traffic from different applications, and an optimized, converged WAN. MPLS/IP VPN Services can allow customer to connect sites together thru the carrier's network in a secure fashion, forming a virtual private network for that customer. Examples of VPN services can include AT&T Virtual Private Network (AVPN), IP-Enabled Frame Relay (IPFR), Enhanced Virtual Private Network (EVPN), and Private Network Transport (PNT).

The ECSU can be adapted to perform one or more of the following:

change packet encapsulation for each of the packets without examining packet data payload or layer three packet headers and thereby provide a transparent protocol conversion between the Ethernet network and the Serial WAN;

map virtual local area networks (VLANs) to logical sub-interfaces on WAN access circuits of the Serial WAN. Thereby, the ECSU can be adapted to support multiple VLANs between devices on the Ethernet network and devices on the Serial WAN;

provide a switching-based function at the ECSU adapted to switch packets between an Ethernet VLAN and a WAN bundle;

provide a policy-based function adapted to switch packets between an Ethernet VLAN and a WAN bundle;

support transmission rates on the Ethernet network of between one megabits per second and ten gigabits per second;

not decrement an Internet Protocol (IP) time to live (TTL) field of packets as the packets pass through the ECSU;

convert a serial address to an Ethernet Media Access Control (MAC) address for the first device;

convert a serial address to an Ethernet Media Access Control (MAC) address for the second device;

via the proxy address resolution request, convert an Internet Protocol (IP) address to a Media Access Control (MAC) address for the first device;

dynamically detect a WAN Internet Protocol (IP) address of a provider edge device of the Serial WAN;

based upon the WAN IP address, dynamically assign an address to an Ethernet interface of the ECSU and the first device; and/or support a promiscuous mode wherein the ECSU processes all received packets on an Ethernet interface rather than just packets addressed to the ECSU. When used herein, wherein means in regard to which; and; and/or in addition to.

At activity 5500, the packet can be transmitted from the ECSU to a destination device. The destination device can be the second device for packets transmitted from the first device or the first device for packets transmitted from the second device. The packets can be transmitted via one or more routers comprised by the Ethernet network and/or the Serial WAN.

At activity 5600, the ECSU can be adapted to cause a point-to-point connection to be established between the first device and the second device. When used herein, cause means to bring about, provoke, precipitate, produce, elicit, be the reason for, result in, and/or effect. The point-to-point connection can be formed utilizing the obtained address of the second device and/or the logical MAC address.

When used herein, further means in addition. When used herein, said means when used in a system or device claim, an article indicating a subsequent claim term that has been previously introduced. When used herein, substantially means to a considerable, large, and/or great, but not necessarily whole and/or entire, extent and/or degree. When used herein, when means at a time.

When used herein, Open Systems Interconnection (OSI) reference model means a general functional model for computer and/or data network architecture developed by the International Standards Organization (ISO). The OSI model can be useful as a framework for international standards in heterogeneous computer network architecture. The OSI model can be logically partitioned into seven layers, namely, from lowest to highest: 1) physical layer, 2) data link layer, 3) network layer, 4) transport layer, 5) session layer, 6) presentation layer, 7) application layer. Functional equivalents to these layers are considered included in this definition.

When used herein, data link layer means a layer in the OSI model wherein data packets are encoded and decoded into bits. The data link layer can furnish transmission protocol knowledge and management. The data link layer can handle errors in the physical layer, flow control, and/or frame synchronization, etc. The data link layer can be divided into two sublayers: The Media Access Control (MAC) layer and the Logical Link Control (LLC) layer. The MAC sublayer can control how a computer on the network gains access to the data and permission to transmit the data. The LLC layer can control frame synchronization, flow control, and/or error checking, etc.

When used herein, network layer means a layer in the OSI model that provides switching and/or routing. For example, the network layer can provide logical paths, known as virtual circuits, for transmitting data from node to node. Functions of this layer can include routing, forwarding, addressing, internetworking, error handling, congestion control, and/or packet sequencing.

Figure 6:
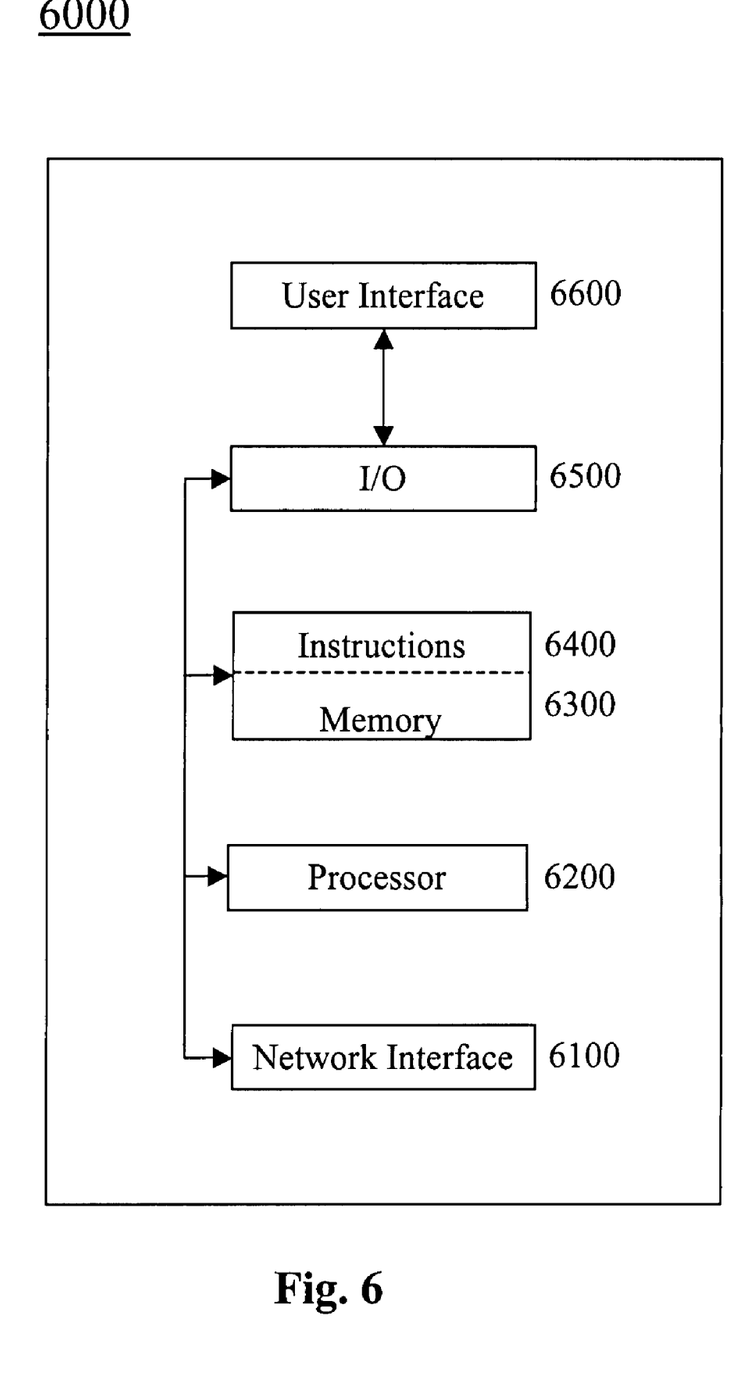
FIG. 6 is a block diagram of an exemplary embodiment of an information device 6000.

FIG. 6 is a block diagram of an exemplary embodiment of an information device 6000, which in certain operative embodiments can comprise, for example, first information device 1300, second information device 1600, server 1400, and server 1500 of FIG. 1. Information device 6000 can comprise any of numerous components, such as for example, one or more network interfaces 6100, one or more processors 6200, one or more memories 6300 containing instructions 6400, one or more input/output (I/O) devices 6500, and/or one or more user interfaces 6600 coupled to I/O device 6500, etc.

In certain exemplary embodiments, via one or more user interfaces 6600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

When used herein, processor means a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

When used herein, information device means any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

When used herein, input/output (I/O) device means any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

When used herein, memory device means an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

When used herein, render means to display, annunciate, speak, print, and/or otherwise make perceptible to a human, for example as data, commands, text, graphics, audio, video, animation, and/or hyperlinks, etc., such as via any visual, audio, and/or haptic means, such as via a display, monitor, printer, electric paper, ocular implant, cochlear implant, speaker, etc.

When used herein, signal means information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

When used herein, user interface means a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

DEFINITIONS

When the following terms are used substantively herein for which definitions are provided, those definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

- there is no requirement for the inclusion of any particular described or illustrated characteristic, function, activity, or element, any particular sequence of activities, or any particular interrelationship of elements;
- any elements can be integrated, segregated, and/or duplicated;
- any activity can be repeated, performed by multiple entities, and/or performed in multiple jurisdictions; and
- any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc. When used herein, otherwise means in other respects. When used herein, otherwise means in other respects.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, every portion (e.g., title, field, background, summary, abstract, drawing figure, etc.) of this application, other than the claims themselves, is to be regarded as illustrative in nature, and not as restrictive.

What is claimed is:

1. A method comprising:
providing a layer two packet conversion between a serial wide area network protocol and an ethernet network protocol via an ethernet channel service unit, wherein the ethernet channel service unit provides point-to-point access to a layer three network service between a first device configured to communicate using the ethernet network protocol via an ethernet network and a second device configured to communicate using the wide area network protocol via a serial wide area network, wherein the point-to-point access is provided without examination of the data payloads and without examination of the layer three packet headers;
dynamically detecting a wide area network internet protocol address of a provider edge device of the serial wide area network; and
based upon the wide area network internet protocol address, dynamically assigning an address to an ethernet interface of the ethernet channel service unit and the first device.

2. The method of claim 1, wherein via the point-to-point access is via single communications link.

3. The method of claim 1, wherein via the point-to-point access is via at least one multiple bonded communications link.

4. The method of claim 1, further comprising:
changing packet encapsulation for each of the packets without examining packet data payload or layer three packet headers and thereby provide a transparent protocol conversion between the ethernet network and the serial wide area network.

5. The method of claim 1, further comprising:
changing packet encapsulation for each of the packets without examining packet data payload or layer three packet headers and thereby provide a transparent address map between the ethernet network and the serial wide area network.

6. The method of claim 1, further comprising:
mapping virtual local area networks to logical sub-interfaces on wide area network access circuits of the serial wide area network, the ethernet channel service unit thereby configured to support multiple virtual local area networks between devices on the ethernet network and devices on the serial wide area network.

7. The method of claim 1, further comprising:
providing a switching-based function at the ethernet channel service unit adapted to switch packets between an ethernet virtual local area network and a wide area network bundle.

8. The method of claim 1, further comprising:
providing a policy-based function at the ethernet channel service unit adapted to switch packets between an ethernet virtual local area network and a wide area network bundle.

9. The method of claim 1, wherein the ethernet channel service unit is adapted to support transmission rates on the ethernet network of between one megabits per second and ten gigabits per second.

10. The method of claim 1, further comprising:
not decrementing via the ethernet channel service unit an internet protocol time to live field of packets as the packets pass through the ethernet channel service unit.

11. The method of claim 1, further comprising:
converting a serial address to an ethernet media access control address for the first device via the ethernet channel service unit.

12. The method of claim 1, further comprising:
converting a serial address to an ethernet media access control address for the second device via the ethernet channel service unit.

13. The method of claim 1, further comprising:
converting an internet protocol address to a media access control address for the first device via the ethernet channel service unit and via a proxy address resolution request.

14. The method of claim 1, further comprising:
supporting a promiscuous mode wherein the ethernet channel service unit processes all received packets on an ethernet interface rather than just packets addressed to the ethernet channel service unit.

15. A non-transitory machine-readable medium encoded with instructions executable by a processor to perform the steps comprising:
providing a layer two packet conversion between a serial wide area network protocol and an ethernet network protocol via an ethernet channel service unit and without examining data payloads or layer three packet headers of packets, wherein the ethernet channel service unit is configured to change packet encapsulation for each of the packets without examining internet protocol layer three packet data content and thereby provide transparent ethernet to serial protocol conversion, wherein the ethernet channel service unit provides point-to-point access to a layer three network service between a first device configured to communicate using the ethernet network protocol via an ethernet network and a second device configured to communicate using the wide area network protocol via a serial wide area network;
dynamically detecting a wide area network internet protocol address of a provider edge device of the serial wide area network; and
based upon the wide area network internet protocol address, dynamically assigning an address to an ethernet interface of the ethernet channel service unit and the first device.

16. A system comprising:
an ethernet channel service unit, wherein the ethernet channel service unit is configured to:

provide a layer two packet conversion between a serial wide area network protocol and an ethernet network protocol;

map virtual local area networks to logical sub-interfaces on wide area network access circuits of a serial wide area network, thereby the ethernet channel service unit configured to support multiple virtual local area networks on an ethernet network;

provide point-to-point access to a layer three network service between a first device configured to communicate using the ethernet network protocol via the ethernet network and a second device configured to communicate using the wide area network protocol via the serial wide area network, wherein the point-to-point access is provided without examination of the data payloads and without examination of the layer three packet headers;

dynamically detect a wide area network internet protocol address of a provider edge device of the serial wide area network; and dynamically assign an address to an ethernet interface of the ethernet channel service unit and the first device based upon the wide area network internet protocol address.

17. A method comprising:

providing a layer two packet conversion between a serial wide area network protocol and an ethernet network protocol via an ethernet channel service unit and without examining data payloads and without examining layer three packet headers of packets, wherein the ethernet channel service unit is configured to switch packets between an ethernet virtual local area network and a wide area network bundle, wherein the ethernet channel service unit provides point-to-point access to a layer three network service between a first device configured to communicate using the ethernet network protocol via an ethernet network and a second device configured to communicate using the wide area network protocol via a serial wide area network;

dynamically detecting a wide area network internet protocol address of a provider edge device of the serial wide area network; and based upon the wide area network internet protocol address, dynamically assigning an address to an ethernet interface of the ethernet channel service unit and the first device.

* * * * *